June 2, 1942.  W. T. MARTIN  2,284,668
PACKAGE
Original Filed April 8, 1937   2 Sheets-Sheet 1
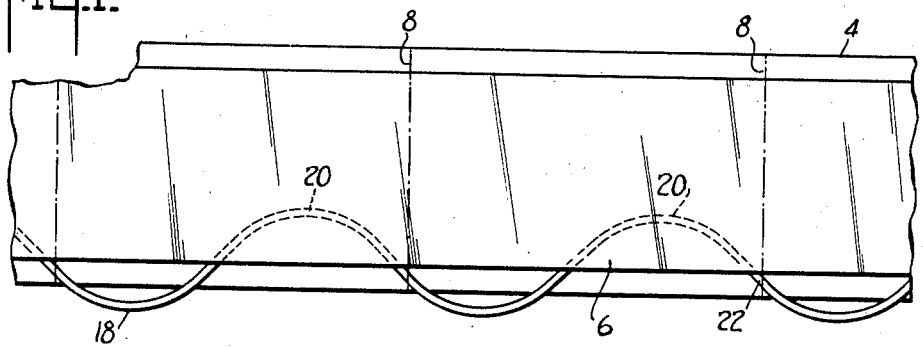
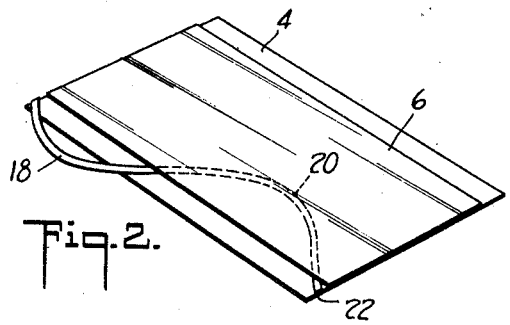
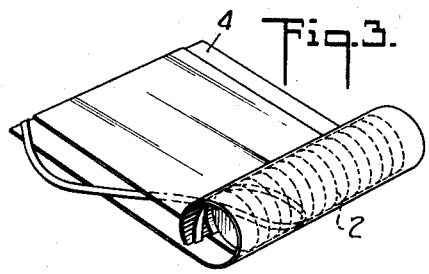
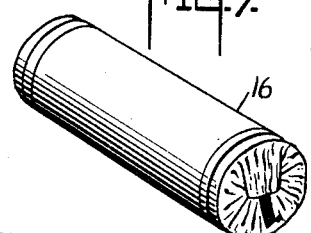
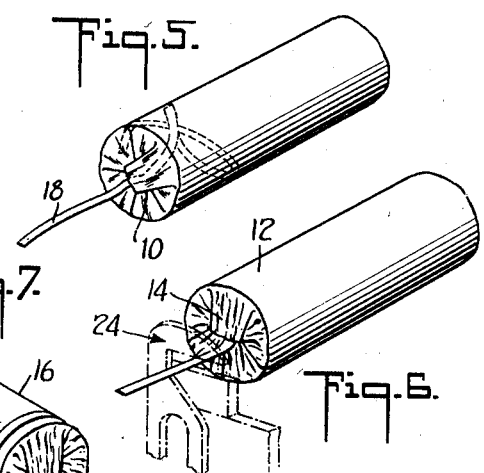
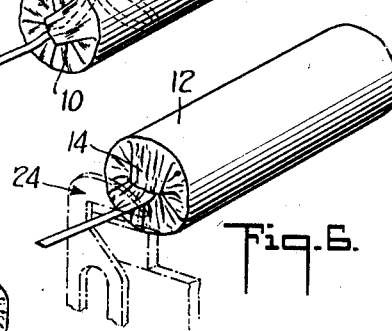
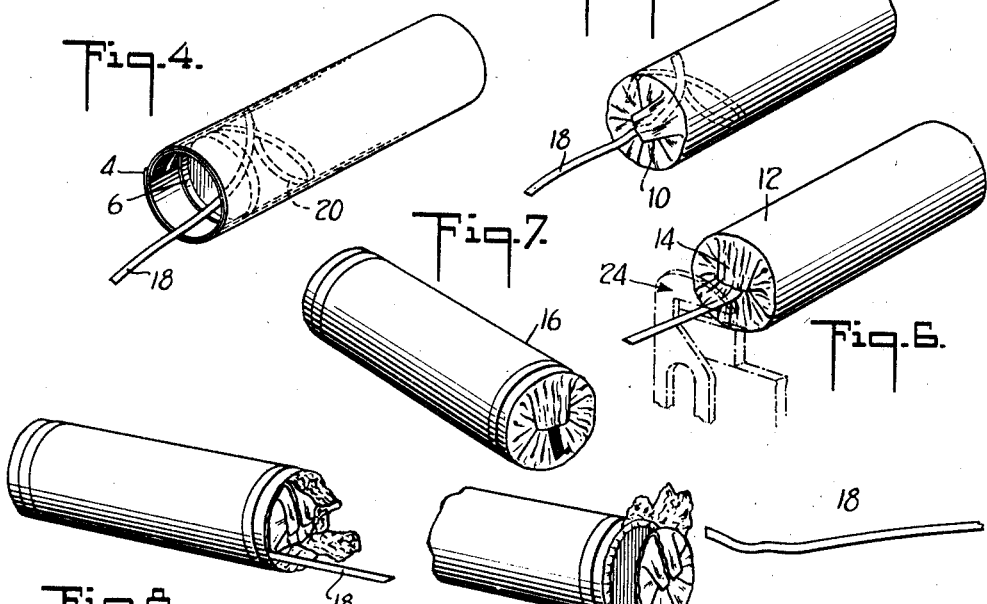
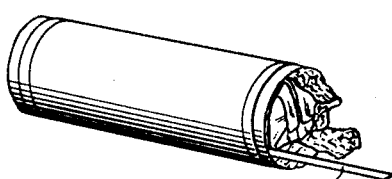
INVENTOR
WILLIAM T. MARTIN
BY
Bartlett Eyre Scott Keil
ATTORNEYS June 2, 1942.  W. T. MARTIN  2,284,668
PACKAGE
Original Filed April 8, 1937  2 Sheets-Sheet 2
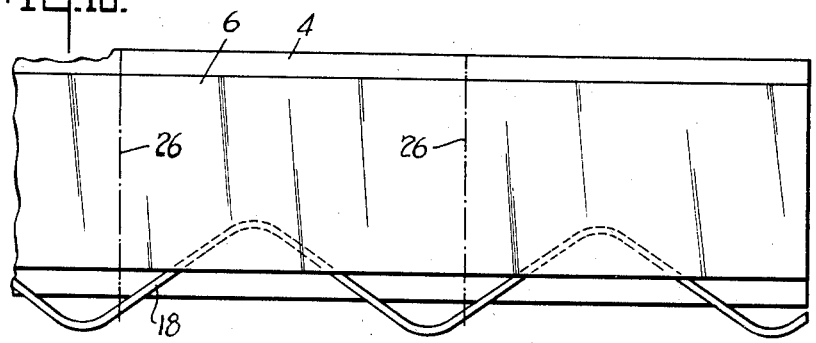
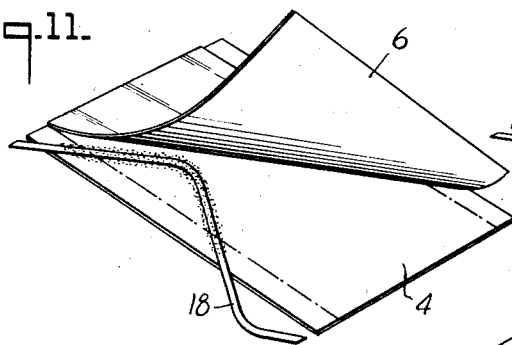
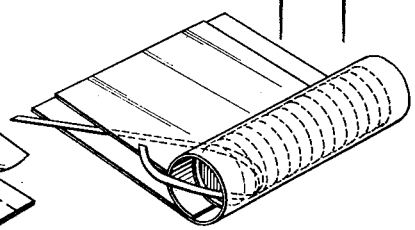
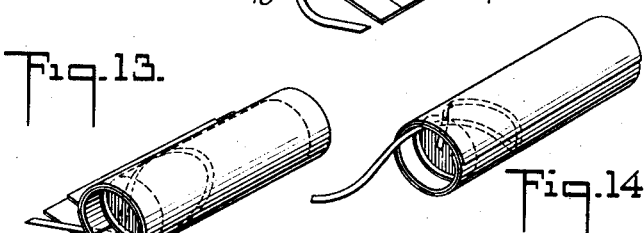
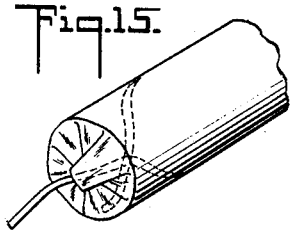
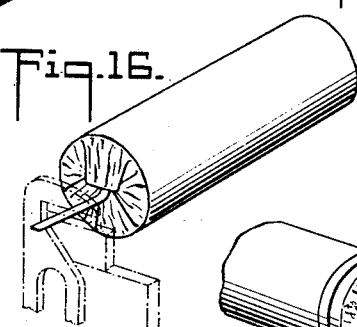
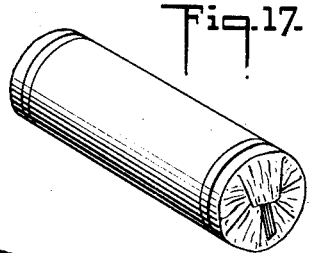
INVENTOR
WILLIAM T. MARTIN
BY
ATTORNEYS Patented June 2, 1942

2,284,668

UNITED STATES PATENT OFFICE 2,284,668

PACKAGE

William T. Martin, Canajoharie, N. Y., assignor to Beech-Nut Packing Company, Canajoharie, N. Y., a corporation of New York Original application April 8, 1937, Serial No. 135,655. Divided and this application July 7, 1939, Serial No. 283,200

5 Claims. (Cl. 229—51)

The present invention relates to packages, and has special reference to packages of hard or cooked candies in which the candies are arranged in stacks or rolls.

Rolls of hard or cooked candies are commonly wrapped first with a waxed paper wrapper which is wound around the periphery of the roll and its ends tucked in over the ends of the roll and then similarly wrapped with a sheet of foil, the foil enclosing the waxed paper. Heat is then applied to the tucked in ends and peripheral surface of the foil wrapper so as to partially melt the wax of the waxed paper wrapper which when allowed to cool tightly seals the longitudinal seam and the end tucks of the wrappers. Owing to such heat-sealing of the wrappers it is difficult to open the package which is usually done by attempting to open up the tucks of the two wrappers at one end of the package with the fingers.

One of the objects of the present invention is to provide means in a package, particularly a package wrapped in the manner above-described, for easily opening the package.

The several features of the invention whereby the above and other objects may be attained, will be readily understood from the following description and accompanying drawings, in which:

Fig. 1 is a plan view of a portion of a composite paper strip of wrapping material and tearing ribbon previously to being cut to form the individual wrappers of my improved package;

Fig. 2 is a view in perspective of one of the individual wrappers when cut from said strip;

Fig. 3 shows the wrapper partially wound around the peripheral surface of a roll of candies;

Fig. 4 is a view in perspective showing said wrapping material completely wrapped about the peripheral surface of the candy roll;

Fig. 5 is a similar view of the end portion of a roll with the end of the waxed paper wrapper tucked in over the end of the roll;

Fig. 6 is a similar view showing the package completely wrapped in foil and with devices about to cut off a projecting portion of the tearing ribbon of the package;

Fig. 7 is a view in perspective of the package when completely wrapped;

Fig. 8 is a similar view with the tearing strip partially pulled out so as to partially open one end of the package;

Fig. 9 is a similar view with the tearing strip completely pulled out and the end of the package open;

Figs. 10 through 19 are of a modified form, said figures substantially corresponding respectively to Figs. 1 through 9.

The packages and method illustrated in the drawings are of the type of the package and method described and claimed in the patents to Grant and Hambrecht, Nos. 2,043,829 and 2,043,830, both dated June 9, 1936. The present application is a division of my pending application Ser. No. 135,655, filed April 8, 1937 and which resulted in Patent No. 2,189,347, dated February 6, 1940.

In wrapping a stack or roll of articles 2 (Fig. 3) such as hard candies that are in the form of circular disks, a strip of waxed paper 4 and a strip of unwaxed paper or glassine 6 are placed one above the other, the glassine being narrower and spaced equal distances from the longitudinal edges of the waxed strip 4. The composite strip thus provided is cut on lines 8 to form the individual wrappers as illustrated in Fig. 3. This composite wrapper is initially applied to the candy roll by wrapping it about the peripheral surface of the roll with the unwaxed paper on the inside as illustrated in Figs. 3 and 4. When the composite wrapper is thus applied the glassine lining extends slightly beyond the ends of the candy roll and the waxed paper extends a distance beyond the lining. Thereafter the ends of the two wrappers are tucked in over the ends of the roll, the tucks 10 of the waxed paper wrapper being radially arranged in overlapping relation.

The package with the paper wrapping applied is then similarly wrapped in foil 12, the end tucks 14 of the foil wrapper being arranged similarly to the paper tucks 10. Thereafter heat is applied to the tucked in ends and peripheral surface of the foil wrapper so as to partially melt the wax of the waxed paper wrapper and seal the package, the radial end tucks of the paper wrapper being firmly secured together. After this heat-sealing operation a label 16 is applied about the peripheral surface of the foil wrapper with its ends spaced a distance from the ends of the package. The method of wrapping thus described is similar to that illustrated and described in said Grant et al. Patent No. 2,043,829.

In accordance with the present invention, as the paper strips 4 and 6 are brought together, a tearing strip 18 is laid between the two paper strips. This tearing strip may be of textile material and in the form of a narrow ribbon. The tearing ribbon is applied in a sinuous line as illustrated in Fig. 1, it being alternately curved in opposite directions. Preferably melted wax is applied to the tearing strip 18 previously to it being positioned between the paper strips and the two paper strips are heated to melt the wax of the waxed paper, and are firmly pressed together so as to secure the tearing ribbon 18 between them when the wax becomes cool. The tearing ribbon 18 is cut off upon cutting the paper strips 4 and 6 upon the lines 8 to form the individual wrappers. The tearing ribbon is applied and cut off in such a manner that in the individual wrappers the inner grooved portion 20 of the tearing ribbon extends in an arc from substantially one of the inner corners 22 of the glassine lining to substantially the center of the wrapper, with the remaining portion of the tearing strip projecting out from beneath the unwaxed paper with its end portion projecting beyond the waxed paper as shown.

In wrapping the composite paper wrapper about the roll of candies, when the wrapper has been wrapped substantially once around the roll as illustrated in Fig. 3, the inner end portion of the tearing ribbon is crossed by the outer portion of the ribbon, and during the balance of the winding of the wrappers about the roll the outer end of the ribbon is held outwardly so that when the wrapper is completely wrapped about the roll the outer end of the ribbon will project from the open end.

During the tucking in of the ends of the wrapper, the outer end of the tearing ribbon is continued to be held outwardly from the package. At the completion of the tucking operation, the outer end of the tearing ribbon projects outwardly from between the two plies of the last tuck to be formed.

The outer end of the tearing ribbon is also held outwardly during the wrapping of the package in foil, and at the completion of the tucking in of the ends of the foil the end of the tearing strip projects outwardly from beneath the end of the last tuck that is formed. The excess amount of the ribbon may then be cut off by means of cutting knives 24.

With the tearing strip thus applied, upon pulling outwardly on the outer end of the ribbon, the outer ply of the outermost tuck of the ribbon end of the package is first torn down to the periphery of said end. Then upon continued pulling on the tearing ribbon, the ribbon tears the wrappers, both the foil and paper wrapper, about said edge of said end as illustrated in Figs. 8 and 9 so as to completely sever off this end of the wrapper exposing the endmost candies.

During this tearing operation, the looped arrangement of the tearing ribbon about the peripheral surface of the package and the fact that it is secured by the wax of the wrappers, causes the ribbon to naturally tear around the edge of the package and this may be done without opening up the wax sealed tucks.

Instead of pulling straight out from the end of the package, if the tearing ribbon is pulled downwardly it may be caused to follow its loop arrangement around the package, thus causing several candies to be exposed to view.

In the package and method illustrated in Figs. 10 to 19, inclusive, the tearing ribbon may be applied to the two strips similarly to that above described as shown in Fig. 10. In cutting the composite strip to form the individual packages, the strips are cut on lines 26 which causes the inner end portion of the tearing ribbon to project from the wrappers a greater distance than the outer end portion.

When the paper wrapping is applied to the peripheral surface of the candy roll, instead of the outer end of the tearing ribbon projecting from the end of the package, the inner end projects from the end of the package, the inner end portion of the ribbon extending across the underside of the outer end portion. Upon pulling on the end of the ribbon as thus applied, the end tucks are successively opened up as the strip travels about the package. In this form the end tucks may be opened up without substantial tearing of the wrapping.

Where no glassine lining is employed, the tearing ribbon may be secured to the waxed paper wrapper alone.

As will be evident to those skilled in the art, my invention permits various modifications without departing from the spirit thereof or the scope of the appended claims.

What I claim is:

1. In a package, a wrapper of waxed paper wrapped about the cylindrical surface of an article with its ends tucked in over the ends of the article, a lining of unwaxed paper secured to the inner side of the waxed paper and extending about the cylindrical surface of the article, a wrapper of foil enclosing the waxed paper wrapper with its ends tucked in over the tucked in ends thereof, and a tearing strip secured between the waxed paper wrapper and said lining and extending in loop form about the cylindrical surface of the article with its end portions arranged beneath one of the tucked in ends of the waxed paper wrapper and with one of said ends projecting out from one of the tucks of the waxed paper wrapper and outside of the foil wrapper.

2. In a package, a wrapper of waxed paper wrapped about the cylindrical surface of an article with its ends tucked in over the ends of the article and sealed, a wrapper of foil enclosing the paper wrapper with its ends tucked in over the tucked in ends thereof, and a tearing strip secured to the inner side of said paper wrapper and looped about the cylindrical surface of the article with its end portions arranged beneath one of the tucked in ends of the paper wrapper and with one of said ends projecting out from beneath one of the tucks of the paper wrapper and outside of the foil wrapper.

3. In a package, a wrapper wrapped about the longitudinal surface of an article with its ends tucked in over the ends of the article, and a tearing strip looped around the longitudinal surface of the article with its end portions crossing one another at a point in proximity to one end of the article, one end of the tearing strip projecting outwardly from beneath the wrapper tucks at said end of the article, and the other end of the tearing strip being positioned adjacent to said end of the article.

4. A structure according to claim 3 in which the end portion of the tearing strip that projects outwardly from beneath the wrapper tucks overlies the other end portion of the tearing strip at the point of crossing of said end portions.

5. A structure according to claim 3 in which the end portion of the tearing strip that projects outwardly from beneath the wrapper tucks underlies the other end portion of the tearing strip at the point of crossing of said end portions.

WILLIAM T. MARTIN.